A. W. L. HARTBAUER & L. C. SPARKS.
METALLIC LETTER CASE.
APPLICATION FILED SEPT. 17, 1912.
1,078,280.
Patented Nov. 11, 1913.
2 SHEETS—SHEET 1.
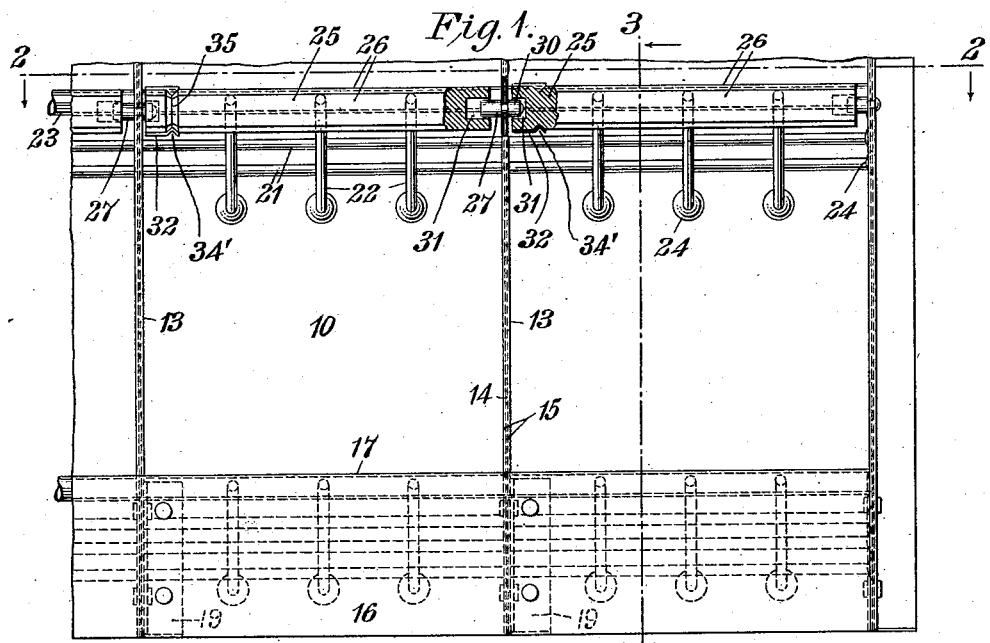
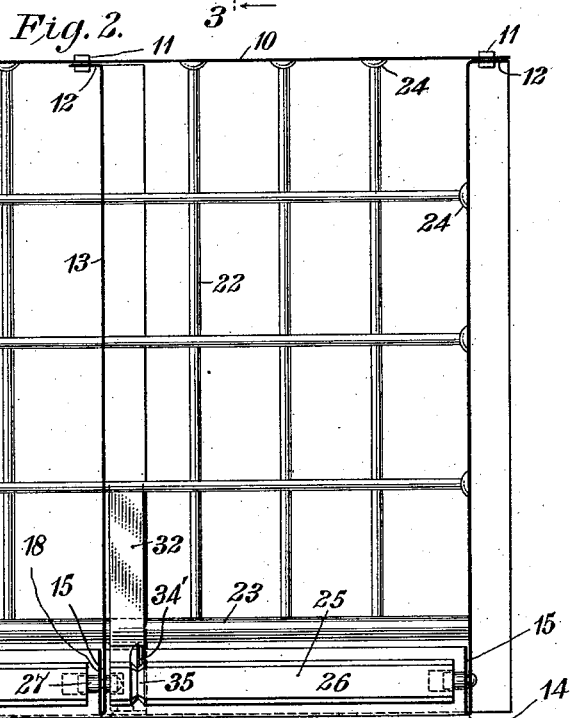
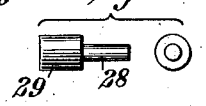
WITNESSES
C. L. Belcher
W. S. Orton
INVENTORS
Levi C. Sparks
August W. L. Hartbauer
BY F. H. Gibbs
ATTORNEY

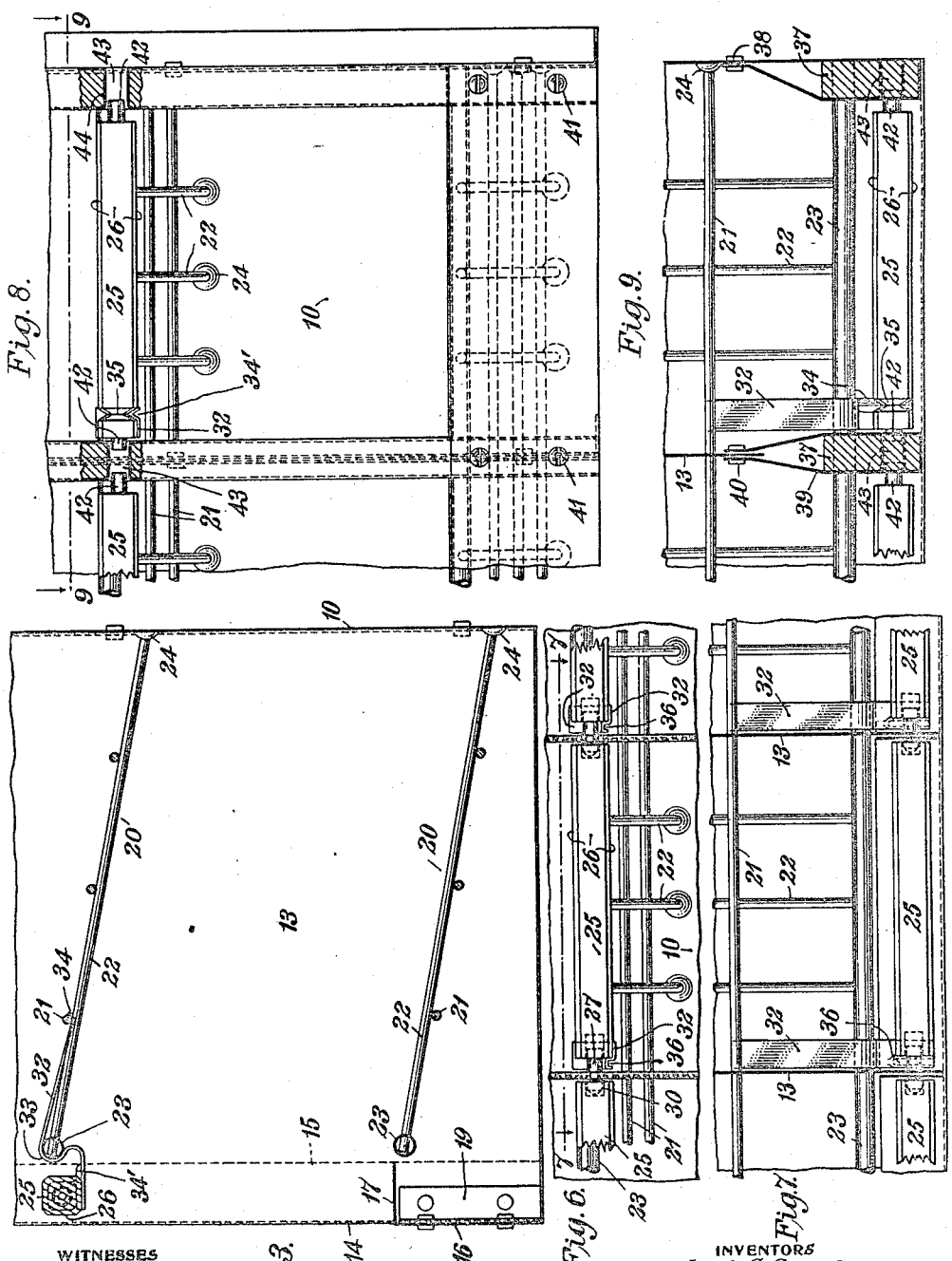

UNITED STATES PATENT OFFICE.

AUGUST W. L. HARTBAUER, OF CHICAGO, ILLINOIS, AND LEVI C. SPARKS, OF ST. LOUIS, MISSOURI, ASSIGNORS TO AMERICAN CAR & FOUNDRY COMPANY, OF ST. LOUIS, MISSOURI, A CORPORATION OF NEW JERSEY.

METALLIC LETTER-CASE.

1,078,280.   Specification of Letters Patent.   Patented Nov. 11, 1913.

Application filed September 17, 1912. Serial No. 720,888.

*To all whom it may concern:*

Be it known that we, AUGUST W. L. HARTBAUER and LEVI C. SPARKS, citizens of the United States, and residents, respectively, of the city of Chicago, State of Illinois, and of the city of St. Louis, State of Missouri, have invented certain new and useful Improvements in Metallic Letter-Cases, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof will occur to persons skilled in the art.

In said drawings: Figure 1 is a front elevation of a portion of a case showing a physical embodiment of a preferred form of our invention. Fig. 2 is a horizontal cross section of the same and taken on a plane indicated by the line 2—2 of Fig. 1, looking in the direction of the arrow. Fig. 3 is a vertical transverse sectional view taken on a plane indicated by the line 3—3 of Fig. 1, and looking in the direction indicated by the arrow. Fig. 4 is a side and end view of a pivoting stud. Fig. 5 is a coacting retaining collar. Figs. 6 and 7 together illustrate a second modified form of construction and Figs. 8 and 9 illustrate a third form. Fig. 6 is a fragmentary front elevational view of a portion of a form of casing embodying a modified form of spindle holding means, and Fig. 7 is a sectional view in plan looking down upon the same and taken on the line 7—7 of Fig. 6. Fig. 8 is a view similar to Fig. 1 showing the third modified form, and Fig. 9 is a horizontal plan view of the same taken on the line 9 of Fig. 8 looking in the direction of the arrow.

Our invention relates to a metallic letter case particularly adapted for use in the railroad mail service, and an object of our invention is to provide a device of the above indicated character of relatively thin sheets of metal, so constructed and arranged that the parts may be mutually braced and reinforced, and in which the casing is made up of a minimum number of parts which are preferably standardized.

It is a further object of our invention to provide in a device of the above indicated character, a label holder, which may be readily mounted or dismounted in the cases, and which will be held in position by a simple form of retaining means.

It is to be understood that in postal cars a series of longitudinal and vertically spaced compartments are formed for the reception of mail matter, and as shown in the drawing, these compartments are formed by a rear wall which may be the car side, extending forwardly from which are a series of spaced apart vertical partitions disposed between which partitions are vertically spaced horizontally disposed bottoms or decks, forming a series of vertically disposed compartments. The vertical compartments are duplicated throughout the length of the car, and but one of these compartments will be described in detail, it being understood that this description will apply with obvious mechanical changes to all of the compartments.

Referring to the drawings, it will be noted that there is a vertically disposed rear wall 10, preferably of relatively small gage sheet metal, but which especially in steel cars may be the side wall of the same. Extending forwardly from the rear wall 10, and fastened thereto by means of rivets 11, passing through a longitudinally angled flange 12 thereof are a series of longitudinally spaced apart partitions 13, which partitions may extend from the roof members to the floor or may be of any other desired height, and extend forwardly a distance equal to the desired depth of the compartment. In order to reinforce the front upstanding edges of these partitions the same is rebent upon itself or beaded to form a smooth outer edge 14, and a double reinforced thickness of metal as shown at 15. These partitions are maintained in their spaced relation by means of an inverted L shaped and longitudinally extending facing plate 16, which plate is preferably positioned at the lower part of the front reinforced edges of the partitions 13. The upper leg 17 of this plate 16 has a series of spaced apart transversely extending kerfs 18, each kerf containing a front edge of one of the partitions 13. In this construction it will be seen that the partitions are maintained in their spaced apart relation, and are braced in position by the angled facing 16. Each partition 13 is fastened to the plate 16 by means of an angle iron 19 riveted to the under and rear side of the plate 16, and in the angle between one face of a partition 13, and the inner face of the vertical leg of the plate 16.

As shown in Fig. 3, there are two superimposed and spaced apart bottoms or decks 20, disposed in advance of the rear wall 10, and between adjacent partitions, but it is of course to be understood that any number of these decks or bottoms may be utilized as desired. These decks are preferably of an openwork construction and as shown of a wire mesh consisting of longitudinally extending rods 21, disposed between the end partitions and transversely extending rods 22 disposed in advance of the rear wall 10, angularly disposed with reference to the longitudinal rods 21, and preferably fastened to the same by welding or other suitable means. Outlining the front of this bottom or deck is a longitudinally extending tubing 23, as shown extending parallel to the rear wall 10, which tubing is suitably mounted in and extends transversely through the several partitions 13. Likewise, it will be noted from Fig. 2 that the longitudinal rods 21 extend through the intermediary partitions 13. The ends of the rods are inserted into apertures in the rear wall, which apertures are preferably formed in pressed cups 24 in the wall, and the rods are sealed therein by filling the cups with a filler or solder, such as lead. This tubing 23 contains the outer ends of the transverse rods 22, so as to present a smooth, well braced front edge to the decks 20; the tubing 23 is preferably of greater diameter than the rods making up the body of the deck, and is preferably of brass tubing so as to withstand and transmit to the partitions 13 the strains due to the weight on these decks.

It will be noted that the device hereinbefore described forms compartments between adjacent partitions, adjacent decks or between the top deck and the roof or the bottom deck and the floor, which compartments are usually labeled to facilitate the distribution of mail matter, and for this purpose there is rotatably mounted between adjacent partitions, and preferably between the reinforced front edges of the same, a spindle 25, which spindle as shown more particularly in Fig. 3 has a plurality of flat faces 26 circumferentially considered to each of which faces may be affixed, by any suitable means, a label or other writing as may be desired. In the modification shown in Figs. 1, 2 and 5 the spindles are rotatably mounted on the studs 27 which are held in position and extend transversely through the partitions 13.

A suitable form of stud is shown in detail in Figs. 1, 4, and 5, and comprises a shank 28 having an enlarged bearing head, 29. The shank is extended through and fits an opening in the partition, and is capped on the opposite side by a collar 30, forming a coacting bearing head, suitably fixed to the shank 28, the heads 29 and 30 being shown as of equal diameter and disposed on opposite sides of the partition. It will be noted that the head 29 is somewhat longer than the head 30, and that the studs are disposed in alinement and arranged so that a long head projects toward a short head extending from the opposite partition. These heads are adapted to be disposed in recesses 31 in opposite ends of the spindle 25, and are so arranged that the spindle may be moved longitudinally in the direction of the head 29, so as to be contained with a deep recess 31 so that the opposite end of the spindle may be disengaged from the short end of the stud or head 30, thereby forming a means for dismounting the spindle from its position between adjacent partitions. The spindle is maintained in position in engagement with both of the opposing studs or heads and is also maintained in non-rotatably or difficultly rotatable position by means of a substantial S shaped leaf plate spring 32, one crotch 33 of each spring overlaps the tubing 23, and has one of its ends suitably fixed to the deck 20 preferably by having upturned terminus 34 engage under one of the longitudinal rods 21 the opposite or outer end of the S shaped spring 32 extending forwardly and horizontally beneath the spindle 25, and has positioned on the upper face thereof an upwardly extending lip or blade 34′ adapted to engage in one of the circumferentially disposed grooves 35 in the face of the spindle 25, preferably adjacent one end thereby holding the spindle against the tension of the spring, as shown particularly in the modifications shown in Figs. 1, 2, and 3.

As disclosed in the modification shown in Figs. 6 and 7 the spindle is not slotted, but has plane faces, and is held in position by having one end of the spindle engaged by the shoulder 36 formed in the forward end of the leaf spring 32, this shoulder taking the place of the blade 34′, hereinbefore described. It will be understood that in order to remove the spindle 25, it is necessary to disengage the knife blade 34′ from its engagement with the groove 35, or to disengage the shoulder 36 from the end of the spindle, so that the same may be moved longitudinally as hereinbefore described. Spindle 25 may be rotated in order to bring another face thereof to the front by rotating the same against the action of the spring 33, it being understood that as the groove 35 is continuous the blade 34' be pressed into the groove in the next contiguous face in the direction of rotation. It will be seen by this construction but one means is necessary to perform the two functions of preventing the spindle moving longitudinally and oppose accidental rotary movement of the same.

In regard to the modification shown in Figs. 8 and 9, it is to be noted that the front edges of the partitions are outlined by vertical inserts or filling members 37, preferably of wood. These fillers are covered by the partition which, as shown at the right of Fig. 9, is formed by wrapping the metal partition about the filler, and fastening the same to the body of the partition by means of rivets 38 or as shown to the left of Fig. 9, the filler 37 may be contained within the channel member 39, the free inner ends of which channel contain between them the upper edge of the partition 13, said ends and partition being connected by through rivets 40. The filler may be connected to the metallic covering by front screws 41 if desired.

The modification disclosed in Figs. 8 and 9 is further modified from the previously described device in that there is projecting from opposite ends of the spindle 25 unequal length studs 42, which studs engage in opposing recesses 43 in adjacent partitions. These recesses, as shown in Fig. 8, are preferably outlined by flange collars 44. It will be understood that the spindle disclosed in Figs. 8 and 9 works in the same manner as has been described in detail for the modification shown in Figs. 1 to 3, in that it is merely necessary to depress the blade 34 from its engagement with the groove 35, and by moving the spindle lengthwise in the direction of the stud of greatest length, a distance sufficient to permit the opposite stud to be disengaged from its journal recesses, the spindle may be withdrawn for repairing and for substitution, and it will be noted that these spindles may readily be installed in the mail compartments now in use.

What we claim is:—

1. In a letter case, the combination of a rear wall, spaced side partitions riveted to said walls, a plurality of angularly disposed rods disposed between said partitions and in advance of the rear wall and forming the deck, a longitudinally extending tube outlining the front of the deck, the rods at one end being received in said tube, and pressed cups into which the other ends of said rods are sealed.

2. In a metallic letter case comprising a rear wall, spaced side partitions riveted to said wall, said partitions having beaded front edges and an L shaped front facing having a plurality of kerfs in one leg thereof, each kerf adapted to receive the front beaded edge of a partition.

3. In a metallic letter case comprising a rear wall, spaced side partitions riveted to said wall, said partitions having beaded front edges and an L-shaped front facing having a plurality of kerfs in one leg thereof, each kerf adapted to receive the front beaded edge of a partition, and means fastening said facing to the partition.

4. In a metallic letter case, including spaced partitions, means integral with and reinforcing the outer edge of each partition, and means disposed between said reinforced edges and at the lower portion of the front reinforced edges of the partitions to assist in maintaining said partitions in position.

5. In a metallic letter case, a rear wall, spaced side partitions, an L-shaped front facing having a plurality of kerfs, each adapted to receive the front edge of a partition, and means securing said facing to the partition.

In witness whereof we have hereunto set our hands in the presence of the subscribing witnesses.

AUGUST W. L. HARTBAUER.
LEVI C. SPARKS.

Witnesses as to August W. L. Hartbauer:
C. W. RUDOLPH,
DONALD D. MILLIKEN.

Witnesses to Levi C. Sparks:
E. J. LANGTIM,
G. C. CHERBONNIER.

---

Copies of this patent may be obtained for five cents each, by addressing the "Commissioner of Patents, Washington, D. C."